US011591699B2

(12) United States Patent
Arges et al.

(10) Patent No.: US 11,591,699 B2
(45) Date of Patent: Feb. 28, 2023

(54) ELECTROCHEMICAL REACTOR FOR UPGRADING METHANE AND SMALL ALKANES TO LONGER ALKANES AND ALKENES

(71) Applicant: Board of Supervisors of Louisiana State University and Agricultural and Mechanical College, Baton Rouge, LA (US)

(72) Inventors: Christopher George Arges, Baton Rouge, LA (US); John C. Flake, Baton Rouge, LA (US); Yuxin Fang, Baton Rouge, LA (US)

(73) Assignee: Board of Supervisors of Louisiana State University, Baton Rouge, LA (US)

( * ) Notice: Subject to any disclaimer, the term of this patent is extended or adjusted under 35 U.S.C. 154(b) by 111 days.

(21) Appl. No.: 17/046,611

(22) PCT Filed: Apr. 12, 2019

(86) PCT No.: PCT/US2019/027118
§ 371 (c)(1),
(2) Date: Oct. 9, 2020

(87) PCT Pub. No.: WO2019/200187
PCT Pub. Date: Oct. 17, 2019

(65) Prior Publication Data
US 2021/0164115 A1 Jun. 3, 2021

Related U.S. Application Data

(60) Provisional application No. 62/656,538, filed on Apr. 12, 2018.

(51) Int. Cl.
C25B 3/25 (2021.01)
C25B 9/17 (2021.01)
C25B 1/50 (2021.01)

(52) U.S. Cl.
CPC ............ *C25B 3/25* (2021.01); *C25B 1/50* (2021.01); *C25B 9/17* (2021.01)

(58) Field of Classification Search
None
See application file for complete search history.

(56) References Cited

U.S. PATENT DOCUMENTS 5,051,156 A 9/1991 Scharifker
6,294,068 B1 9/2001 Petrovic et al.
(Continued)

FOREIGN PATENT DOCUMENTS

JP H0293089 4/1990
WO 2013107955 A1 7/2013

OTHER PUBLICATIONS

International Search Report for International Application No. PCT/US2019/027118, dated Dec. 6, 2021.
(Continued)

*Primary Examiner* — Wojciech Haske
(74) *Attorney, Agent, or Firm* — Thomas Horstemeyer, LLP

(57) ABSTRACT

This application relates to new process that utilizes electrodes that incorporate acids that facilitate upgrading of methane and other low molecular weight alkanes to higher order hydrocarbon molecules, such as paraffins, olefins, and aromatics, at temperatures less than 250° C. A primary focus of the invention includes methane conversion to ethylene. The first step of the process includes acid containing electrodes that facilitate the activation of the alkane in the anode layer of the electrochemical reactor. Subsequent steps
(Continued)

include the separation of protons from produced longer chain hydrocarbons followed by subsequent electrochemical reduction of the protons to yield hydrogen at the cathode or protons combined with oxygen at the cathode to yield water. The reaction steps in the anode upgrade methane to higher order hydrocarbon products.

20 Claims, 21 Drawing Sheets

(56) References Cited

U.S. PATENT DOCUMENTS

2006/0110632 A1     5/2006   Hong et al.
2015/0119542 A1     4/2015   Weissman
2017/0033385 A1     2/2017   Kim

OTHER PUBLICATIONS

Stoukides, Michael, "Methane conversion to C2 hydrocarbons in solid electrolyte membrane reactors," Research on Chemical intermediates, 2006, pp. 187-204, vol. 32, No. 3-4.
International Search Report for International Application No. PCT/US2019/027118, dated Aug. 5, 2019.

FIGURE 3

Activation, anodic coupling, & dehydrogenation (examples)

$$CH_4 + H^+ \rightarrow CH_5^+$$

$$2CH_5^+ \rightarrow C_2H_6 + 4H^+ + 2e^-$$

$$C_2H_6 \rightarrow C_2H_4 + 2H^+ + 2e^-$$

$$C_2H_6 + H^+ \rightarrow C_2H_7^+$$

$$C_2H_7^+ + CH_5^+ \rightarrow C_3H_8 + 4H^+ + 2e^-$$

$$C_3H_8 \rightarrow C_3H_6 + 2H^+ + 2e^-$$

ELECTROCHEMICAL REACTOR FOR UPGRADING METHANE AND SMALL ALKANES TO LONGER ALKANES AND ALKENES

CROSS REFERENCE TO RELATED APPLICATION

This application is the 35 U.S.C. § 371 national stage of PCT application having serial number PCT/US2019/027118, filed on Apr. 12, 2019. This application also claims priority to U.S. provisional application entitled "ELECTROCHEMICAL REACTOR FOR UPGRADING METHANE AND SMALL ALKANES TO LONGER ALKANES AND ALKENES," having Ser. No. 62/656,538 filed on Apr. 12, 2018, which are entirely incorporated herein by reference.

STATEMENT REGARDING FEDERALLY SPONSORED RESEARCH OR DEVELOPMENT

Not applicable.

REFERENCE TO A "SEQUENCE LISTING", A TABLE, OR COMPUTER PROGRAM

None

DESCRIPTION OF THE DRAWINGS

FIG. 3 presents examples of activation, anodic coupling, & dehydrogenation reactions.

FIELD OF THE INVENTION

Figure 1:
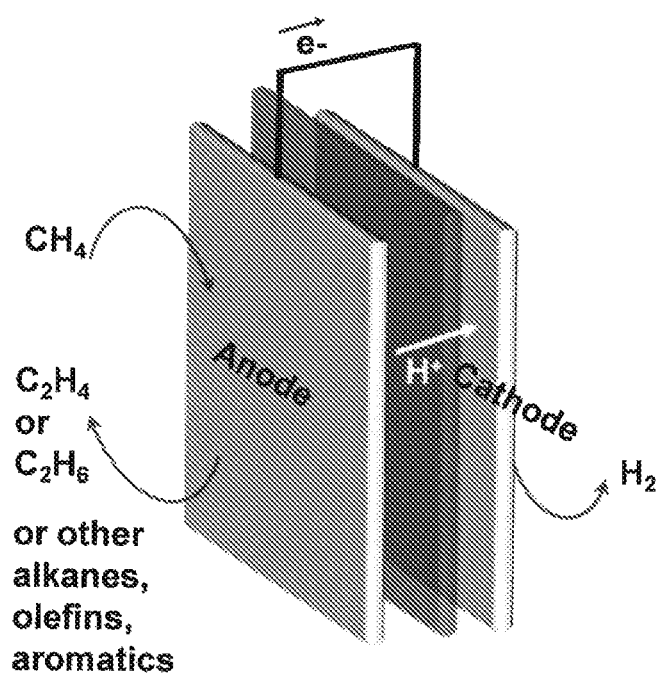
FIG. 1 presents a schematic depicting an electrochemical reactor for converting small molecular weight alkanes, into larger alkanes, olefins, and aromatics where hydrogen evolution occurs at the cathode.

The present invention relates to the general field of chemistry, especially as it relates to synthesis of converting shorter chain alkanes, e.g., methane, to longer chain alkanes (aka paraffins) or alkenes (aka olefins) in a single modular, electrochemical reactor. In particular, the invention relates to the use of electrodes featuring platinum group metal or platinum group metal oxide electrodes, or other transition metal or transition metal oxide electrocatalysts, containing liquid acids or polymer doped acids (e.g., ionomers) to activate the short chain alkanes to facilitate the desired reactions to longer chain alkanes, alkenes, and aromatics.

BACKGROUND OF THE INVENTION

Technological advancements in the extraction of methane from shale layers have led to a "methane boon" in the energy sector for stationary electricity generation. New predictions indicate natural gas could supply 40% of the world's energy demands for the next 200 years. This represents an enormous shift in the global energy outlook; however, the usefulness and versatility of methane (the principal component of natural gas) is limited by its relatively low reactivity. Traditional upgrading of methane occurs through steam reforming to produce hydrogen (critical for ammonia synthesis) and making synthetic (syn)gas. The syngas is then fed to a Fisher-Tropsch process for making other chemicals (e.g., methanol). The existing process for upgrading methane is costly and complex because of the multiple unit operational processes involved at elevated temperatures and pressures. Converting this abundant and low-cost feedstock with fewer processing steps and with less energy consumption to liquid fuels and other commodity chemicals offers the prospect to transform the global chemical industry.

Another relevance of the process disclosed by this application relates to the use of anhydrous or humidified ion-containing polymers in the project. These polymers are converted into polycation ionomer materials, or blends of PBI-polycations, that i.) provide proton conduction under dry conditions and in the temperature range of −20 to 230° C. and ii.) acidity for catalyzing methane coupling in the anode. Achieving adequate proton conductivity, shown as high as 0.28 S cm$^{-1}$, under dry conditions and at elevated temperatures is a challenging proposition because the ionomers typically require condensed water for dissociating the counterion. Overcoming this limitation has been achieved by preparing polycation polymer with acids, polycation-PBI blends with acids,—making acid-cation ion pairs. PBI doped acid can also be used too. The polycation polymers are typically used as anion exchange membranes that conduct anions, but the incorporation of excess acid within the polycation membranes facilitates excellent proton conductivity (up to 0.28 S cm$^{-1}$) at elevated temperatures (up to 230° C.). The acid-cation ion pair approach is more effective than doping PBI with $H_3PO_4$ (i.e., acid-base pair approach) because the more basic quaternary ammonium, imidazolium, or phosphonium cations (and other possible tethered cations) in the polycation foster better acid retention through the acid anion-cation electrostatic interactions (which are stronger than acid-base interactions) leading to greater stability.

Direct oxidation of methane to higher order carbons was a hallmark achievement of Nobel Laureate George C. Olah. His seminal 1968 paper reported the use of a new liquid superacid mixture, antimony (V) pentafluoride ($SbF_5$) combined with fluorosulfonic acid—labeled "magic acid," that protonated the very stable methane molecule to give a fairly stable carbonium pentahydrogen species ($CH_5^+$) that enabled structural studies of carbon cation intermediates that were elusive to carry-out because of their short lifetimes. Olah's methane oligomerization reactions were conducted in $HSO_3F$—$Sb_5F$ mixtures (also known as 'magic acid') at 50-60° C.; however, there were relatively little quantitative product results reported and methane oligomerization was difficult to replicate. Some drawbacks of 'magic acid' include its extremely corrosive properties and its liquid state that makes it difficult to employ in large-scale processes. Over the following two decades, Olah and co-workers prepared solid superacids conducive for use in plug flow reactors. Unfortunately, these solid superacids did not promote methane oligomerization; though, co-feeding a halogen gas results in formation of methyl halides. Because halogen moieties are good leaving groups, they were useful intermediates for methanol synthesis or higher hydrocarbon synthesis in subsequent processes. At a practical level, the process to make methyl halides necessitates chlorine or bromine and these add to the overall cost and complexity of upgrading methane. Chlorine, for example, can account for about 1% to 3% of developed countries' energy consumption because it is produced from the energy-intensive chloralkali process. Hence, upgrading methane to hydrocarbons without halogenated intermediates would simplify methane upgrading and reduce overall costs.

The elusive pursuit of electrochemical oxidation of methane to hydrocarbons can be traced back to the 1970s and 1980s. Brilmyer and Jasinski proposed hydrofluoric acid (HF) mixed with antimony pentafluoride ($Sb(V)F_5$) liquid electrolytes. They proposed graphitic carbon electrodes, in addition to Au and Pt, to couple and oligomerize $CH_5^+$ into ethane, ethylene, or other hydrocarbons in Teflon® lined reactors. It is important consider that $Sb(V)F_5$ is electrochemically active and interfered with the electrochemical oxidation of the low molecular weight alkanes. Brilmyer and Jasinski's strategy worked with alkanes such as ethane, propane and aromatics; however, methane oxidation was not observed.

Fleischmann and Pletcher, Brilmyer and Jasinski ascribed the inability to couple methane electrochemically to the following possibilities: i.) methane was not very soluble in the superacid electrolyte, ii.) methane was not activated at 0° C. with fluorosulfonic acid, and iii.) the reaction occurred slowly and the working electrode was not sensitive enough to detect small electrical currents.

In 1992, Hamakawa et al. reported electrochemical oxidation of methane to ethylene and ethane using a 900° C. electrochemical reactor. Although the production rates and Faradaic efficiencies were low (e.g., 0.5 to 2 μm mol min$^{-1}$ cm$^{-2}$ and Faradaic efficiency value of 5%), methane oxidation and coupling were observed. Furthermore, the cell devised by Hamakawa performed oxygen reduction at the cathode. Thus, this cell could be operated in galvanically, yielding water and a net power output. Unfortunately, the extremely high temperature of the reactor spurred coking and led to catastrophic cell failures. It is also important to mention a related report by Ding et al. showing electrochemical dehydrogenation of ethane to ethylene at 400° C., which is ~450° C. cooler than typical steam-based ethane crackers (and ~500° C. cooler than Hamakama's reactor). This report further highlights the promise that electrochemical routes offer for upgrading low molecular weight alkanes, but Ding's article did not attempt to upgrade methane and the efficiencies for ethane conversion were not given.

A room temperature electrolytic reactor recently reported by Mustain and co-workers activated methane to several different oxygenates using a bifunctional nickel oxide-zirconia electrocatalyst and a carbonate anion. The bifunctional catalyst fostered direct oxygenation from the carbonate anion to methanol in one proposed mechanism, while another potential mechanism takes methoxide (produced from the first mechanism) to formaldehyde that reacts with methane to produce ethanol. Mustain's report does not report energy and Faradaic efficiency values and it does not give production rates, but the oxygenates identified by gas chromatography mass spectrometry (GC-MS) and NMR were methanol, formaldehyde, carbon monoxide, ethanol, isopropanol, acetetate, acetone, carbon dioxide, and formate. A similar report by Ma et al. improved on the aqueous methane conversion process with carbonate anions by using a zirconia-cobalt oxide electrocatalyst; however, these aqueous methane oxidation reports also showed relatively low conversions (<1%) to $C_1$ oxygenates.

Barnett and co-workers and Herring and co-workers have shown direct electrochemical oxidation of methane to carbon dioxide in solid oxide and polymer electrolyte membrane fuel cell devices. The use of fuel cell enables allows one to potentially overcome thermodynamic limitations for extracting energy from combustion of methane—due to Carnot cycle. However, these technologies are in their infancy and they do not upgrade methane to higher order alkanes or alkenes or aromatics—which is what this invention does.

DETAILED DESCRIPTION OF THE INVENTION

Each of the aforementioned approaches for upgrading methane to higher carbon species, like ethane or ethylene or liquid chemical feedstocks like methanol, have shortcomings. Overcoming these limitations requires a new reactor that can accommodate a gas feed stream over a solid-state catalyst bed operated at moderate temperatures (e.g., up to 230° C.) with zero to a few bars of back pressure. However, whereas embodiments of this process could include use of co-fed, costly halogen gas to make methyl-halides, embodiments herein include a process without addition of halogen gas. This embodiment is preferable as it reduces further downstream processing. Several embodiments of this process include an electrochemical reactor that can overcome these limitations through the use of a new class of acid containing, solid-state porous electrodes that can promote ionic conduction in the dry, mild temperature range of 0 to 400° C., with a preferred range of 100 to 250° C. Practically, the reaction temperatures for polymer-based processes would be limited to 400° C. due to the stability of the associated polymers. Embodiments of the process utilize electrode potential, electrode material composition, temperature, and acidity strength in tandem to trigger activation of the very stable methane reactant to subsequently undergo anodic coupling to higher order carbon species.

Figure 14:
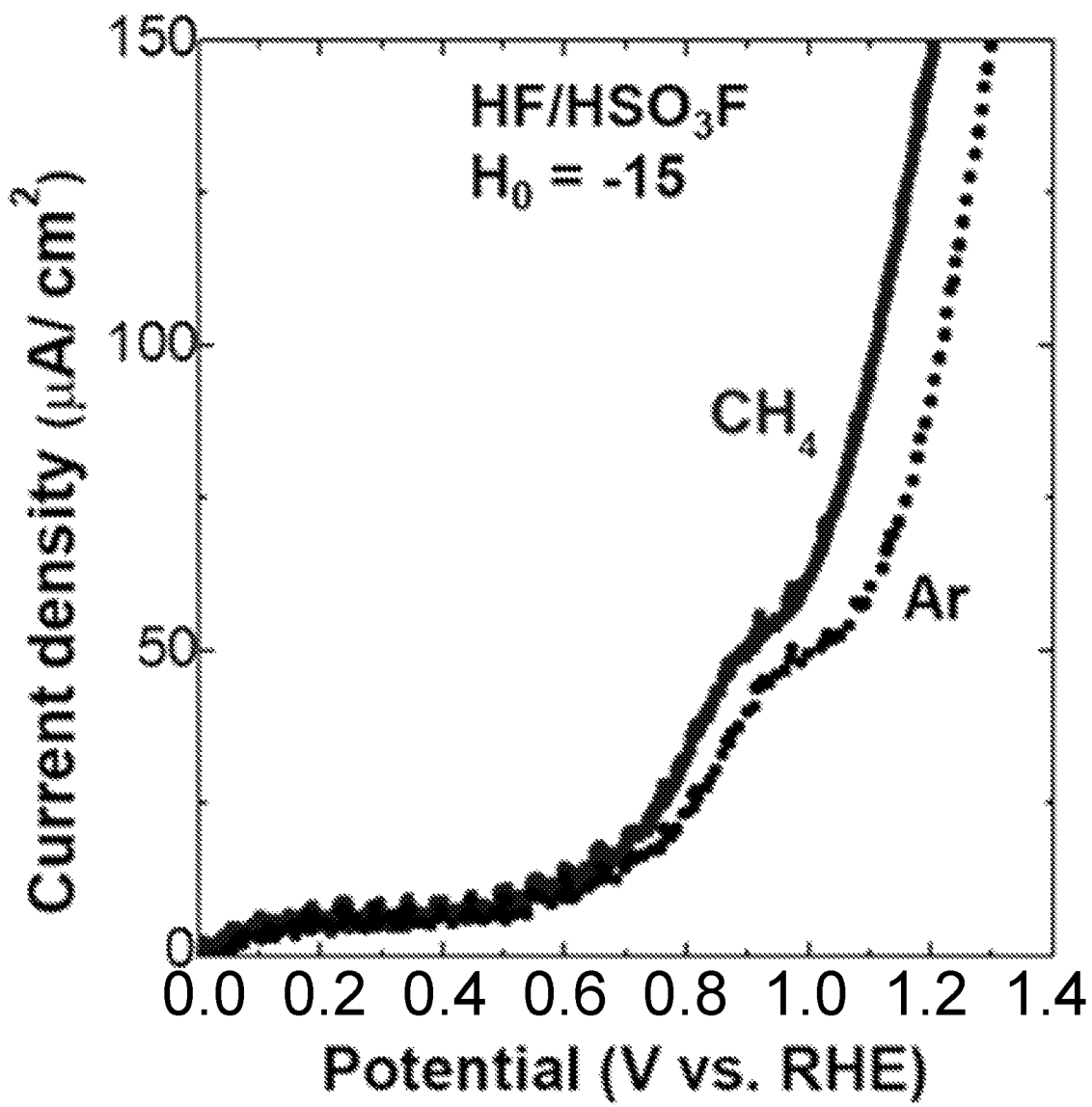
FIG. 14 is a linear sweep voltammogram of electrochemical oxidation of methane in fluorosulfonic acid ($HSO_3F$) mixed with hydrofluoric acid.
Figure 15:
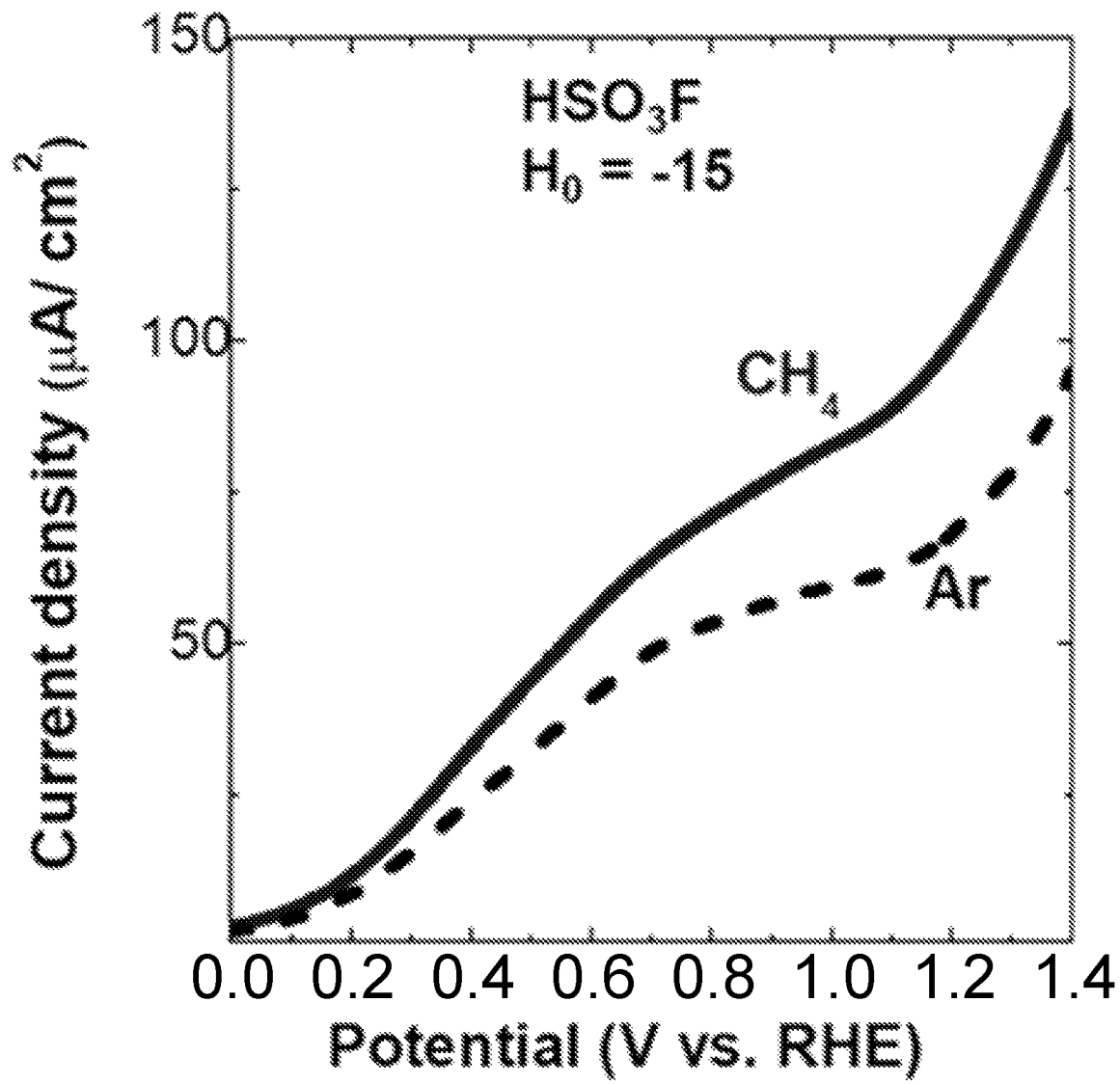
FIG. 15 is a linear sweep voltammogram of electrochemical oxidation of methane in $HSO_3F$.
Figure 16:
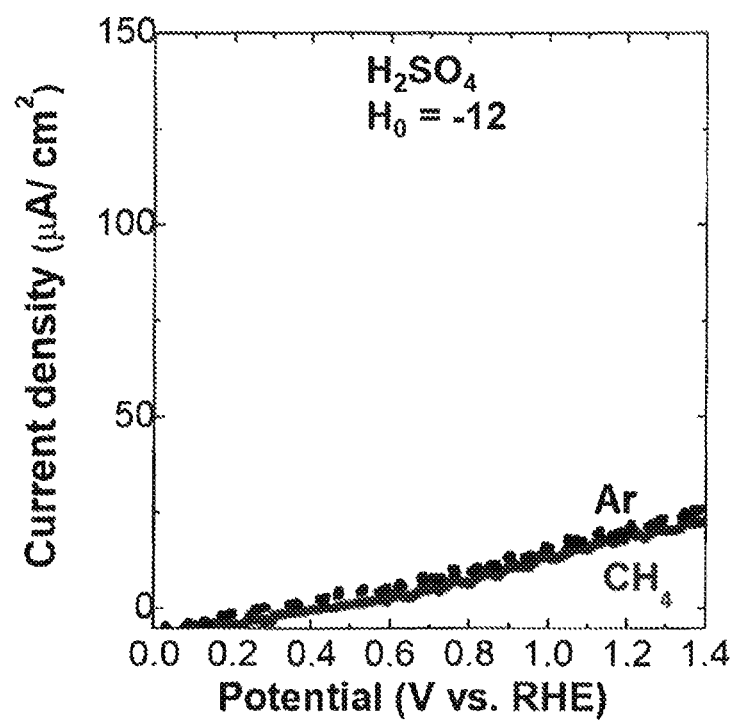
FIG. 16 is a linear sweep voltammogram of electrochemical oxidation of methane in sulfuric acid.

In one embodiment, low molecular alkanes are reacted to form higher order hydrocarbons in a system consisting of noble metal based electrodes and acid electrolytes. Preliminary data has been shown proof-of-concept with liquid superacid electrolytes. Preferably said electrodes consist of platinum group (PT group) metals (platinum, osmium, iridium, ruthenium, rhodium, and palladium) and their oxide variants (e.g., iridium oxide). Methane electrooxidation occurs at Pt group metals (and Pt-group oxides) submerged in acid electrolytes or interfaced with acid-doped polymer electrolytes. Pt-group catalysts in the anode, which may or may not be supported, are relatively stable in acidic environments. In other embodiments, electrodes consist of other noble metals (e.g., copper, silver, gold, rhenium, and mercury). Pt group metals and their oxides can be effective in continuous methane activation and coupling in electrochemical environments. Superacid electrolytes include, at a minimum, trifluoromethanesulfonic acid ($CF_3SO_3H$) and fluorosulfuric acid ($HSO_3F$) and superacid mixtures such as HF, $HSO_3F$, and $H_2SO_4$, and mixtures of sulfuric, chlorosulfonic, or perchloric acids. Other available superacids and acids are listed in FIG. 6. FIGS. 14-16 presents voltammograms showing anodic currents observed in the FIG. 4 embodiment.

In another embodiment, solid-state electrolytes (SSE) based membrane electrode assemblies (MEA) consist of an acid doped polymer binder materials and a noble metal catalyst, preferably a PT group metal or metal oxide on an inert support material. A promising polymer variant binder is the polycation blended with PBI because this material expands the temperature range for achieving proton conductivity in the gas-phase methane electrolysis setups. This material is effective because the electrostatic interactions with the acid anion and the tethered cation group in the polycation anchor the acids within the polymer host and prevent acid leaching or evaporation.

The metal or metal oxide material may be in bulk metal or metal oxide form or as nanostructures (e.g., nanoparticles or nanowires). In one embodiment, the support material is a high surface area carbon material. In another embodiment, the support material is a metal mesh material such as titanium or platinum or other materials resistant to corrosion. The nanostructured metals or metal oxides can be decorated on the bulk titanium, platinum, carbon, or other electron conducting support materials.

Electrodes containing an electron conducting noble metal, preferably a metal from the Pt group or Pt group metal oxides, catalyst. These catalysts can serve as the electrode supports themselves as bulk materials (in some cases porous). In other instances, they can be nanoscale version of the noble metals (e.g., nanoparticles, nanowires, etc.). For the anode, it is preferred to have acid resistant metals. The metal nano-catalysts in the anode should show activity towards low molecular weight alkane activation, binding, and electrochemical oxidation. The cathode will primarily consist of platinum (or nanoscale platinum) on an electron conducting support for the hydrogen evolution reaction. Other catalysts can be used for the hydrogen evolution reaction at the cathode.

Although the process will work with other low molecular weight alkane feedstocks (e.g., ethane, propane, butane, etc.), the disclosed electrochemical process and/or device may have the greatest economic benefits when using methane. For elimination of doubt, Applicant claims herein a process and device for production of higher order (i.e., longer chained) hydrocarbons using low molecular weight alkanes, including methane, ethane, propane, and butane. Higher ordered (compared to the feed) hydrocarbons may be longer chained alkanes, alkenes via dehydrogenation, and aromatics. Produced higher order alkanes alkenes, and aromatics are useful building blocks and can be used to synthesize a large variety of petrochemicals or fuels. The electrochemical upgrading of low molecular weight alkanes via oxidation with acid electrolytes is successful because the acid activates the methane species making it susceptible to anodic coupling to yield higher order hydrocarbons. The gas-phase electrolysis embodiment is to be the most successful because unlike previous attempts, i.) a porous electrode minimizes mass transfer and solubility limitations of low molecular weight alkanes to the electrode/electrocatalyst surface and ii.) temperature combined with electrode potential and back pressure lowers the activation barrier for driving the low molecular weight alkanes oxidation reaction forward in the presence of a acid and catalyst to higher order hydrocarbon products.

This application presents a new class of solid-state acid electrode-ionomer composites, in particular solid-state superacid electrode-ionomer composites, for the electrochemical upgrading of methane, or other low molecular weight alkanes, to higher order hydrocarbon molecules (e.g. methane to ethane and ethylene), preferably at mild temperatures (100 to 250° C.). Embodiments of this electrode utilize acid catalysts, in particular superacid catalysts or Lewis acid catalysts, as part of the electrode to facilitate the desired reaction. The acid catalyst within the anode activates the low molecular weight alkanes followed by subsequent electrochemical anodic coupling. For example, these reaction steps promote carbon-carbon (C—C) coupling and even oligomerization to higher order hydrocarbon products (e.g., methane to ethane and ethylene). Embodiments of the process are further motivated by achieving the goal of upgrading low molecular weight alkanes to higher order hydrocarbons at a reduced net energy input.

Electrode potential (or cell voltage) pulsing and control of wave form are used for selective low molecular weight alkanes upgrading because its sub-microsecond response can terminate the oligomerization reactions that couple low molecular weight alkanes to higher order carbon products. It is a challenging proposition to selectively control low molecular weight alkanes upgrading using a thermally triggered process via oligomerization, because the high temperature that activates low molecular weight alkanes fosters unwanted runaway of the oligomerization process of the products—hence, one often ends up with tar (i.e., very long n-alkanes) rather than $C_2$ to $C_8$ hydrocarbons. The fasttransient response of the electrode (i.e., switching on and off) terminates the oligomerization process quickly and selectively produces lower molecular weight alkanes (e.g., ethane, ethylene, and/or propane). It is important to note that applied electric potential can be removed significantly faster than heat. The reactor configurations shown in FIGS. 1-2 and FIGS. 4-5 can operate in semi-batch mode to selectively upgrade methane electrochemically.

Some of these benefits of embodiments of the claimed process include fewer greenhouse gas emissions for the production of petroleum-based fuels and commodity plastics.

Figure 2:
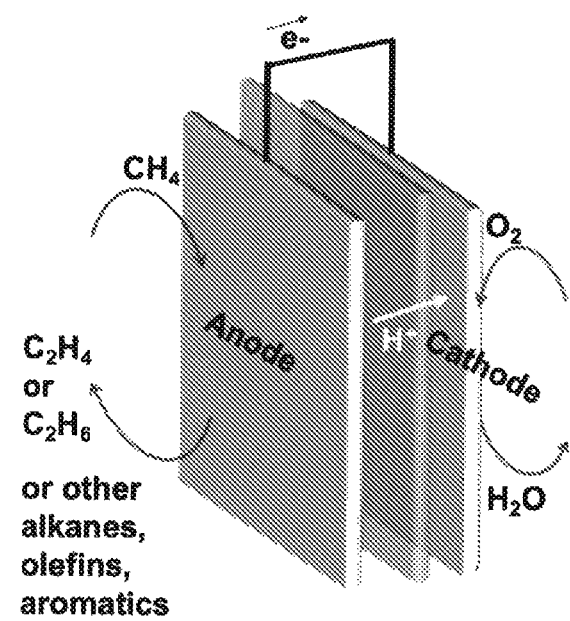
FIG. 2 presents a schematic depicting an electrochemical reactor for converting small molecular weight alkanes, into larger alkanes, olefins, and aromatics where oxygen is reduced at the cathode.
Figure 4:
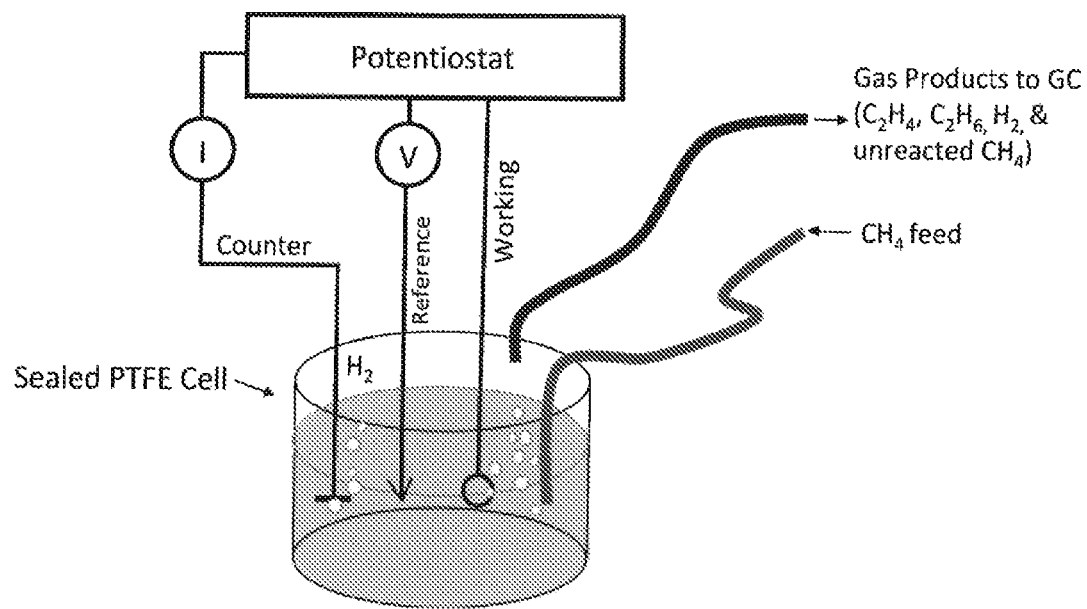
FIG. 4 presents a one compartment embodiment of liquid acid electrolyte setup.
Figure 5:
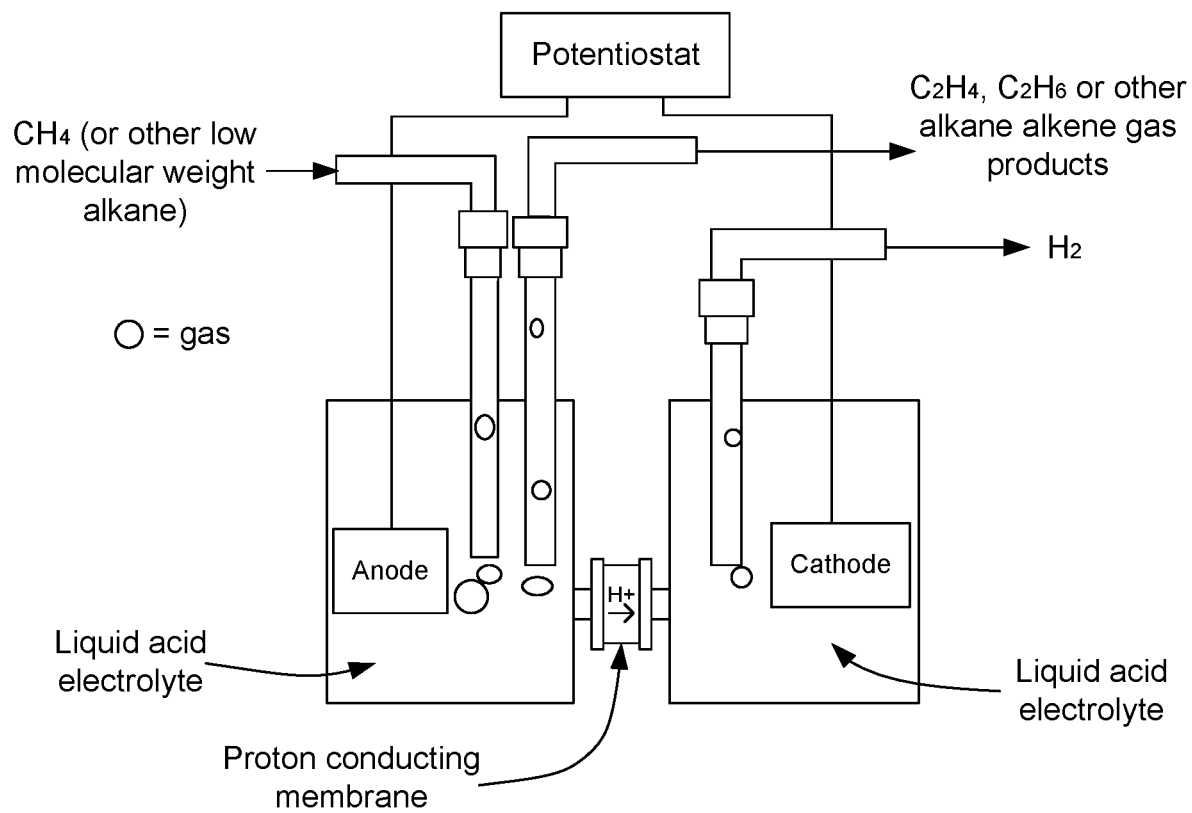
FIG. 5 illustrates an H-cell embodiment that features acid electrolytes and a proton conducting membrane separating two compartments.

As presented in FIGS. 1-2 an FIGS. 4-5, embodiments of the process described herein utilize an anode that is an electrode composed of electrically conductive support material, an acid electrolyte (e.g., superacid, mild acid ($H_3PO_4$) and/or Lewis acid)—can be a liquid variant or a membrane variant, and an ionomer binder in the anode and cathode with a doped acid. Methane, or other low molecular weight alkanes, are fed to a reactor containing an electrically biased anode resulting in the synthesis of larger chain hydrocarbons including ethane ($C_2H_4$), ethane ($C_2H_6$) and hydrogen ions ($H^+$ or protons) at mild temperature (0-400° C., but preferably 100 to 250° C.—particularly for the embodiments with the solid-state configuration (FIGS. 1 and 2)). The process further includes a polymeric proton exchange membrane or liquid electrolyte to keep the anode compartment separated from the cathode compartment and thus thereby separating the alkane reactant(s) and product(s) from the cathode's reactant(s) and product(s). The proton exchange membrane or liquid electrolyte separator also fosters proton transport from the anode to the cathode to aid proton recombination to hydrogen via electrochemical reduction or to aid in electrochemical reduction of oxygen to water. Most embodiments of the invention require the addition of an electrical current to the system. The addition of oxygen to the cathode in the reactor can reduce the net electricity needed for the anode to perform the coupling reaction or to provide a net electrical power output. Conversely, recombining the protons at the cathode yields hydrogen, which is a valuable and important commodity chemical.

FIGS. 1-2 and FIGS. 4-5 presents a schematic depicting an electrochemical reactor for converting methane, and other small molecular weight alkanes, into larger alkanes, olefins, and aromatics (i.e., higher order carbon molecules—e.g., methane conversion to ethane and ethylene). The images in FIG. 1-2 and FIGS. 4-5 convey the process and FIG. 3 some of the reaction steps for upgrading methane that follows methane activation (e.g., protonation) followed by anodic (i.e., electrochemical oxidation) coupling, and even dehydrogenation of alkane species to alkenes (aka olefins). The center rectangular prism in FIGS. 1-2 and FIG. 5 represent a device embodiment of a solid, proton conducting membrane where hydrogen evolution occurs at the cathode (1) or oxygen reduction at the cathode (2). An asymmetric configuration of FIGS. 1 and 2 could exist where the anode materials composition could differ from the cathode. FIG. 4 conveys one compartment embodiment of liquid acid electrolyte setup. FIG. 5 illustrates an H-cell embodiment that features acid electrolytes and a proton conducting membrane separating two compartments. In all the Figures, low molecular weight electrochemical oxidation occurs at the anode (aka as the working electrode in this instance).

Figure 6:
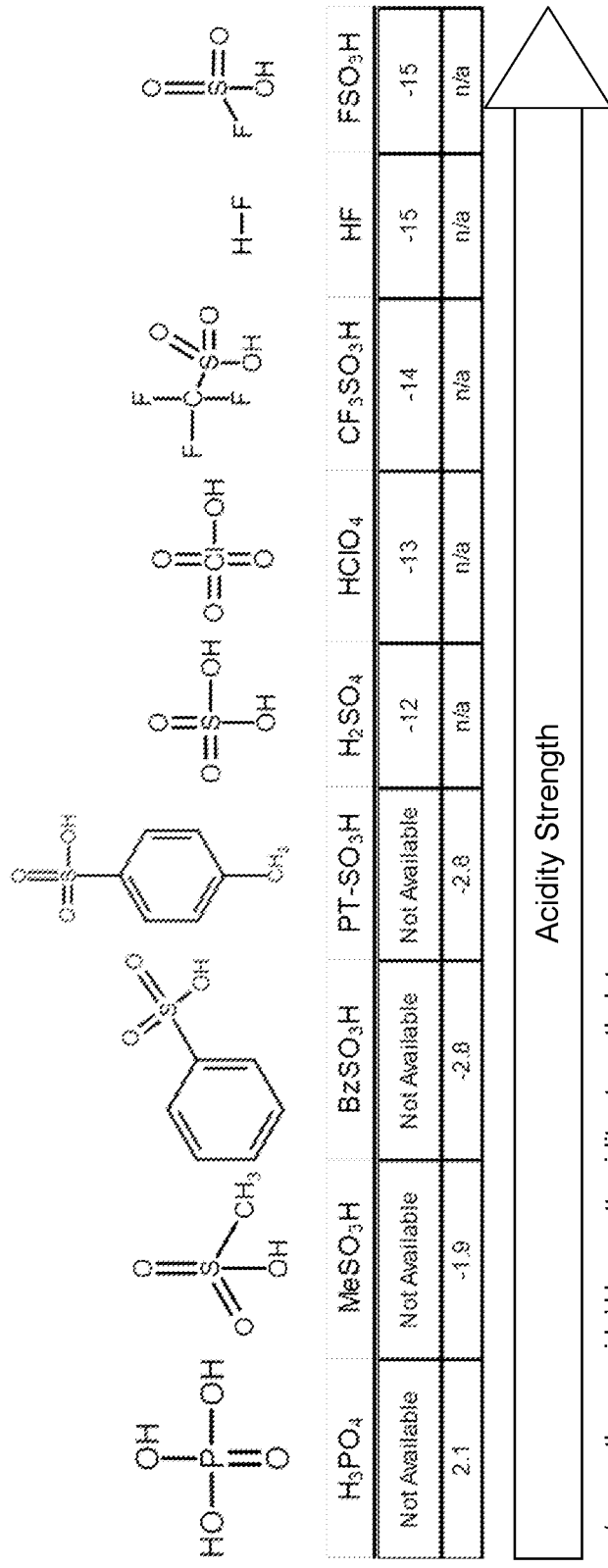
FIG. 6 presents a non-exhaustive list of acid electrolytes that can be used for the devices shown in FIGS. 1-2 and FIGS. 4-5.

FIG. 6 presents a non-exhaustive list of acid candidates for the electrolyte separator (liquid or membrane) and for use in the ionomer binder for the electrodes. The acids could exist in the liquid state or in a polymer host (known as an ionomer). The strength of the acids shown in FIG. 6 are expressed as their pKA value or Hammett acidity strength value (H0).

Figure 7:
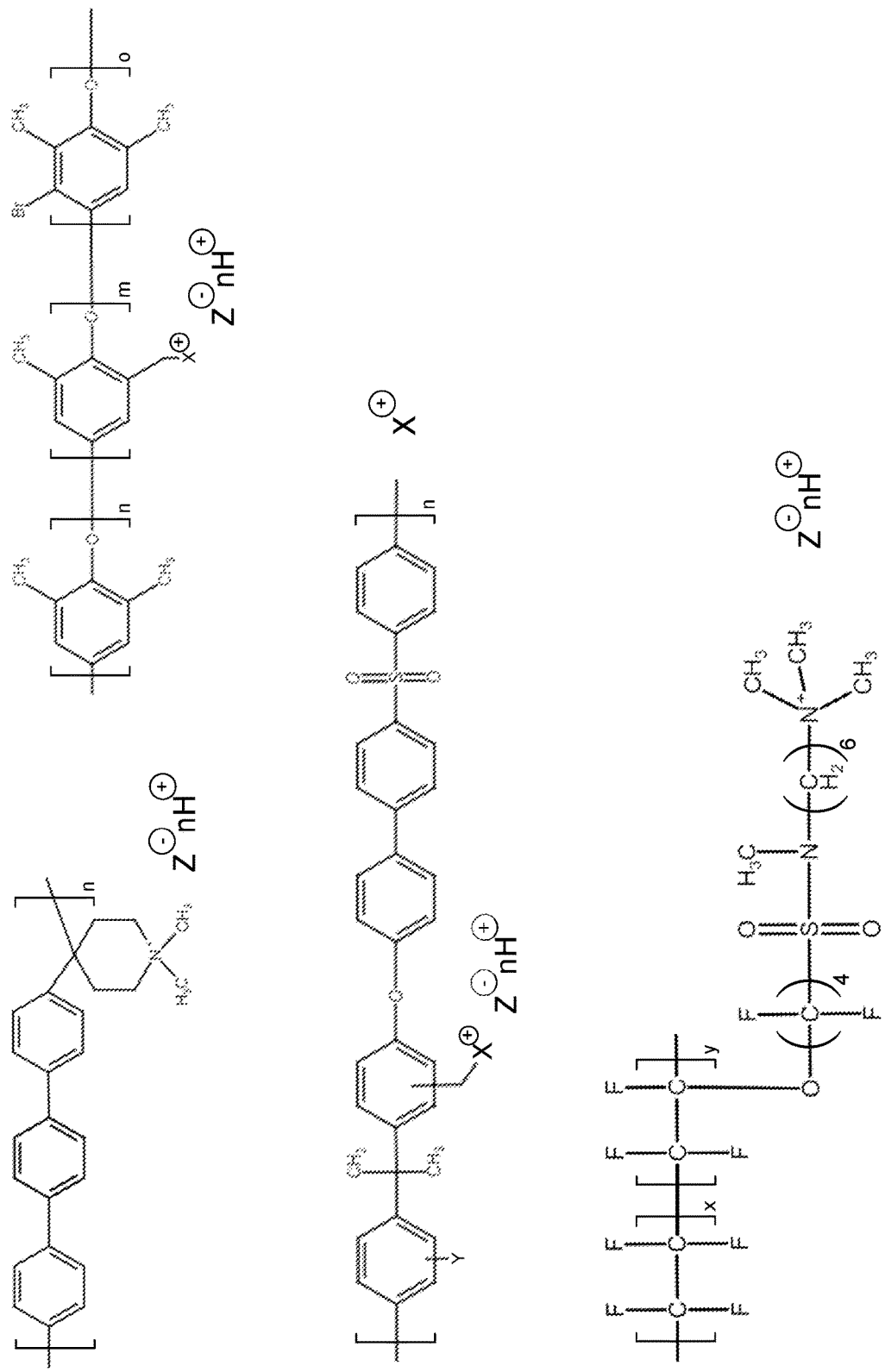
FIG. 7 conveys a several illustrations (non-exhaustive) of polycation chemistries with doped acids and polycation-polybenzimidazole (PBI) blends with acids. PBI doped with acids, not shown, may also be used. The polycation could feature multiple cations on one tethering branch off the main polymer chain.

FIG. 7 presents a non-exhaustive list of polymer hosts for the acid candidates in FIG. 6 for the membrane embodiment of the cell (FIGS. 1, 2 and 5) and electrode binders (FIGS. 1, 2, 4, and 5). FIG. 7 give a representation of the acids coordinated with different polycation chemistries. Acid doped PBI and PBI-polycation blend chemistries could also be used too. The desired properties should be viewed broadly and requiring satisfaction of at least one property described and the material list are examples of materials that meet at least one of the properties. The catalyst materials in the electrodes include platinum group metals or platinum group metal oxides, or transition metal or transition metal oxides. The catalyst materials could consist of bulk foils, wires, meshes, or woven fabrics or nanoscale catalysts. The electrodes could be the catalyst themselves or electron conducting metals that are porous or non-porous and could consist of titanium supports or platinum-galvanized titanium that support the catalyst materials. Other materials know to one skilled in the art may be used in construction of the anode to the extent they meet at least one of the desired properties.

Figure 8:
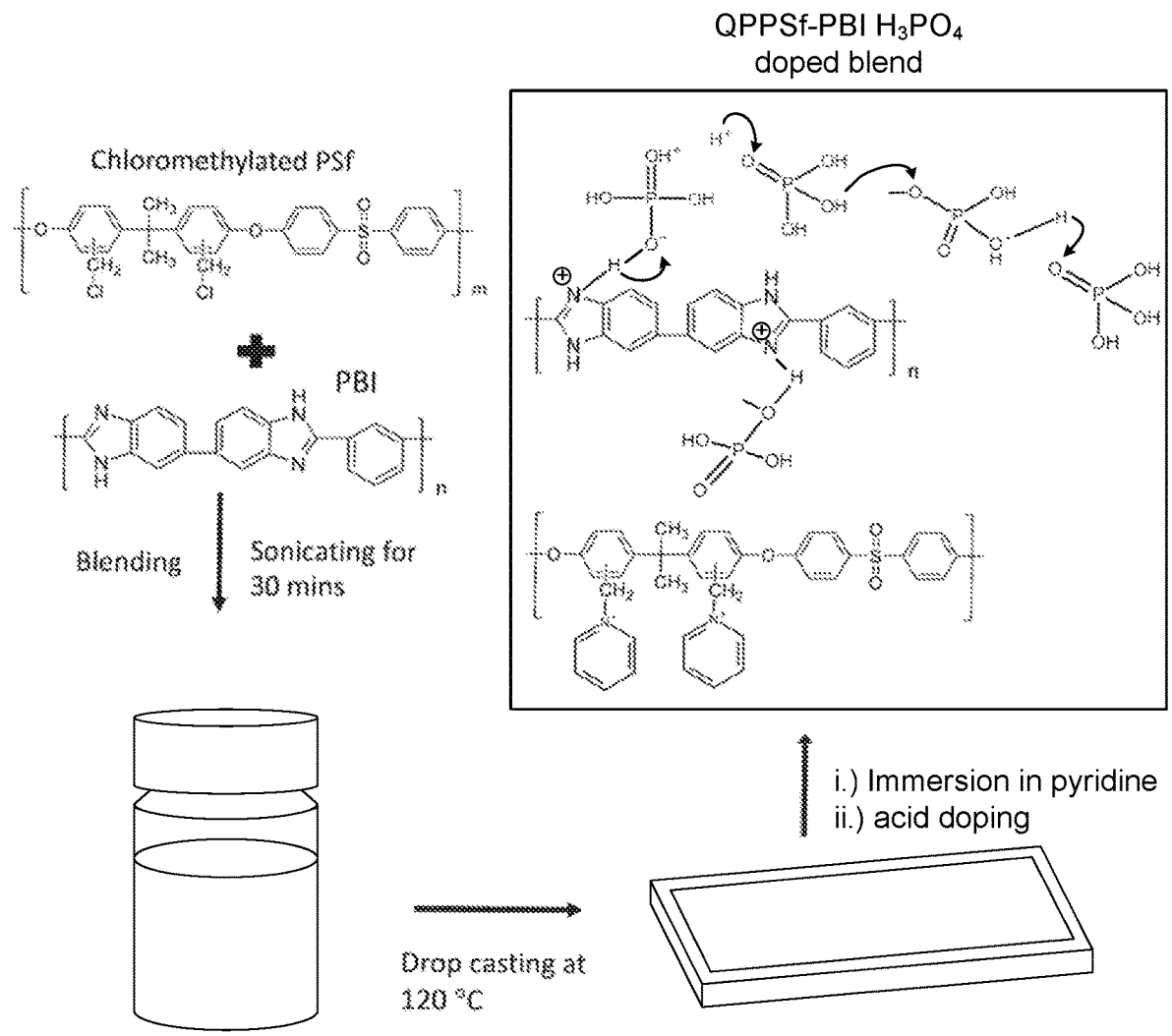
FIG. 8 illustrates the manufacturing method for the polycation-PBI blend. The polycation in the polycation-PBI blend in FIG. 8 is quaternary benzyl pyridinium polysulfone.
Figure 11:
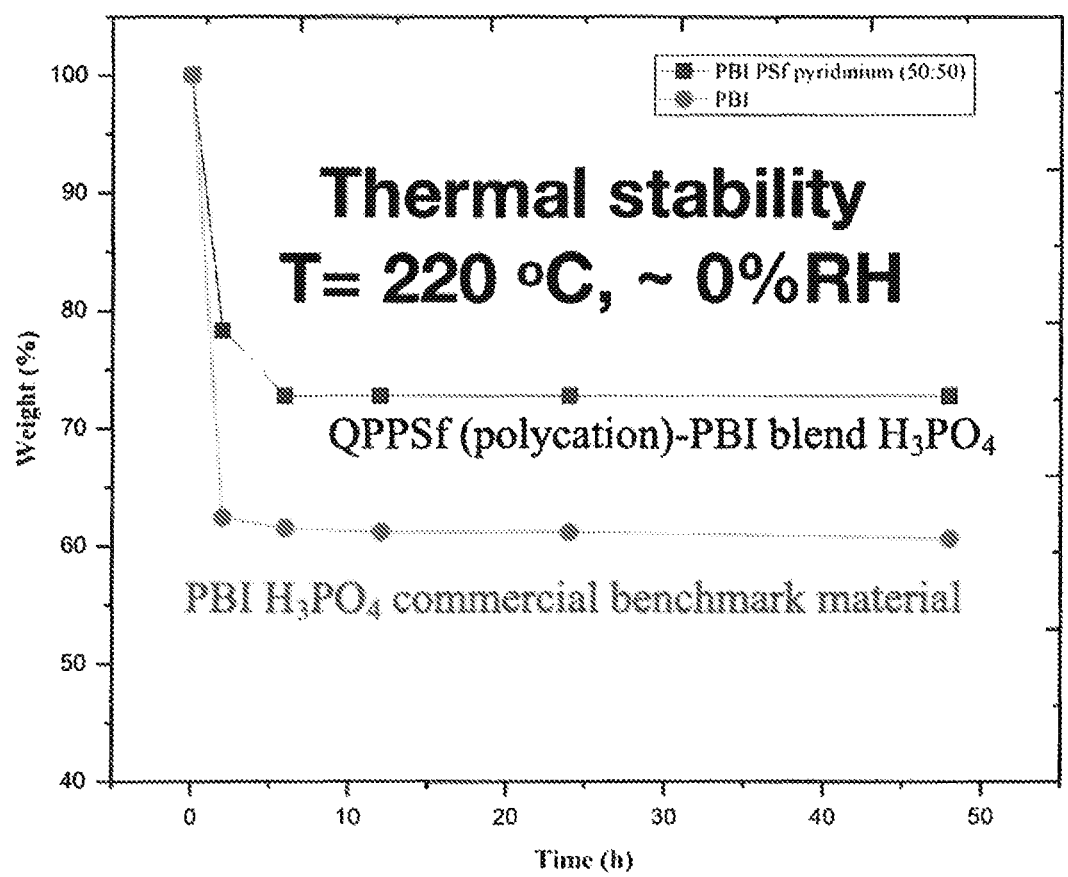
FIG. 11 presents thermal stabilities of PBI and polycation-PBI blends.
Figure 12:
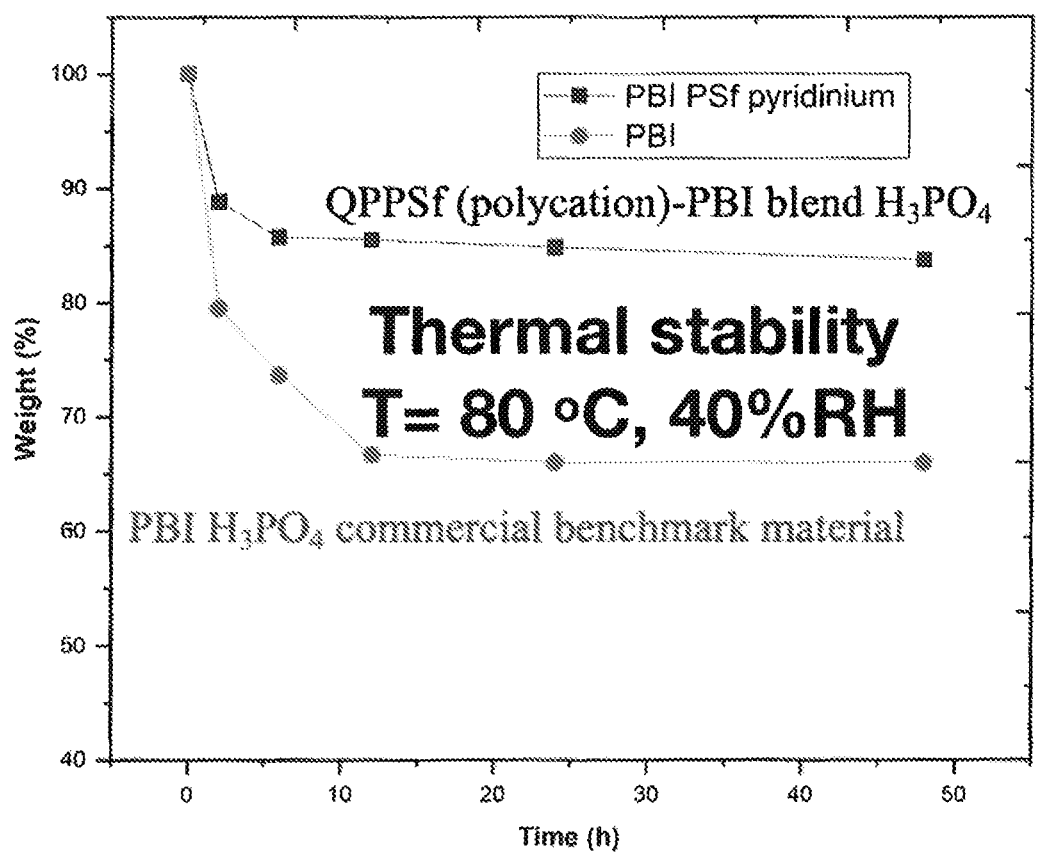
FIG. 12 presents thermal-humidity stabilities of PBI and other polycation-PBI blends.

FIG. 8 illustrates the manufacturing method for the polycation-PBI blend. The polycation in the polycation-PBI blend in FIG. 8 is quaternary benzyl pyridinium polysulfone. This procedure starts with mixing solutions of PBI and chloromethylated polysulfone followed by drop casting a membrane or depositing a catalyst ink. Immersion in pyridine converts the chloromethyl groups to benzyl n-methyl pyridinium chloride. Chloromethylated polysulfone can be prepared by Friedel-Crafts alkylation of commercially available polysulfone polymers. Then, the polycation sample-PBI is doped with acid. The acid doped polymer hosts could serve as the proton conducting membrane show in FIGS. 1, 2, and 5. It also may serve as the electrode binder in FIGS. 1, 2, 4, and 5. These materials can conduct protons under anhydrous conditions as well in the presence of water. They also have been shown to conduct protons under anhydrous conditions up to 230° C. (FIGS. 9-10—polymer hosts doped with phosphoric acid or other acids listed in FIG. 6). In particular, one variant of the PBI-polycation displayed proton conducting as high as 0.28 S cm$^{-1}$ at 220° C. and it retains 70% of its weight over 48 hours at 220° C. at 0% relative humidity (FIG. 11). FIG. 12 shows stability of the PBI-polycation at 80° C. and 40% relative humidity.

FIG. 8 shows the scheme to prepare polycation-PBI polymer blends doped with phosphoric acid ($H_3PO_4$). This material could be doped with other acids listed in FIG. 6 following a similar procedure. The proton conductivity of these polymer hosts doped with other acids (e.g., sulfuric acid ($H_2SO_4$), benzene sulfonic acid, methanesulfonic acid) are given in FIG. 10.

Figure 9:
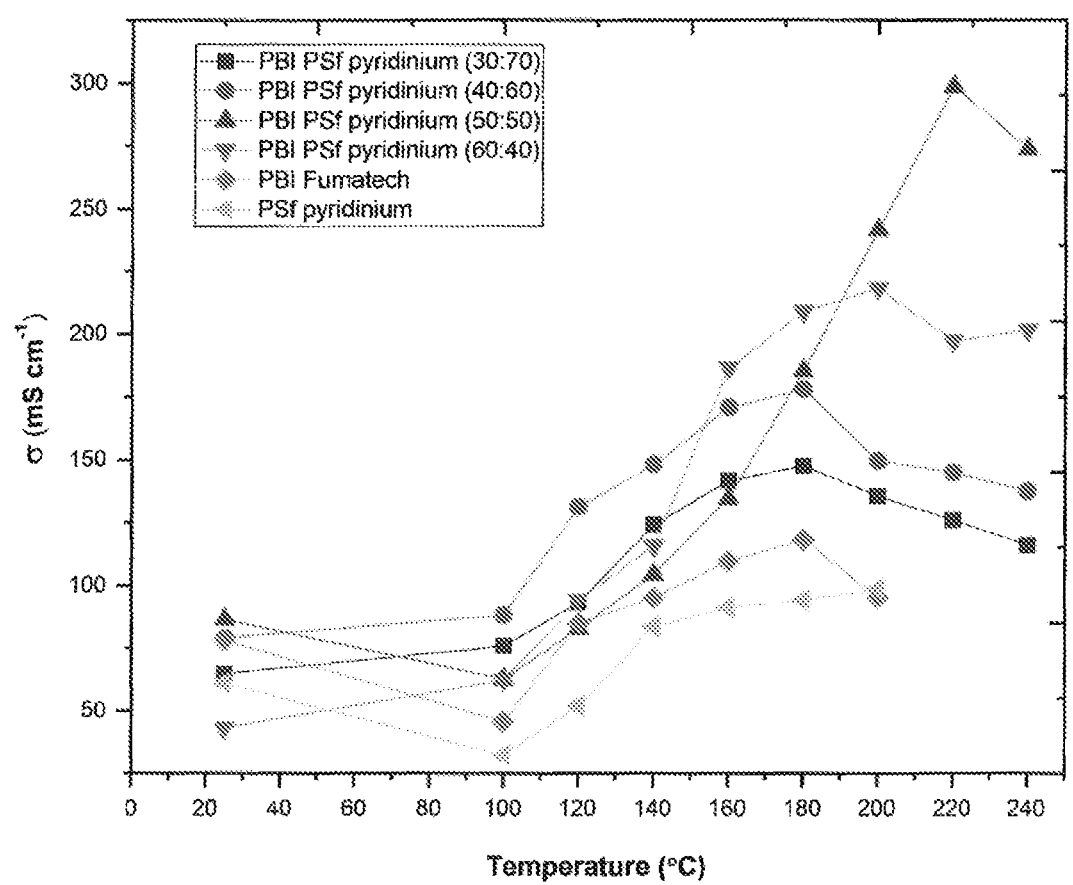
FIG. 9 presents proton conductivity of polycation-PBI blends, PBI, and other polycation chemistries with different acid chemistries.
Figure 10:
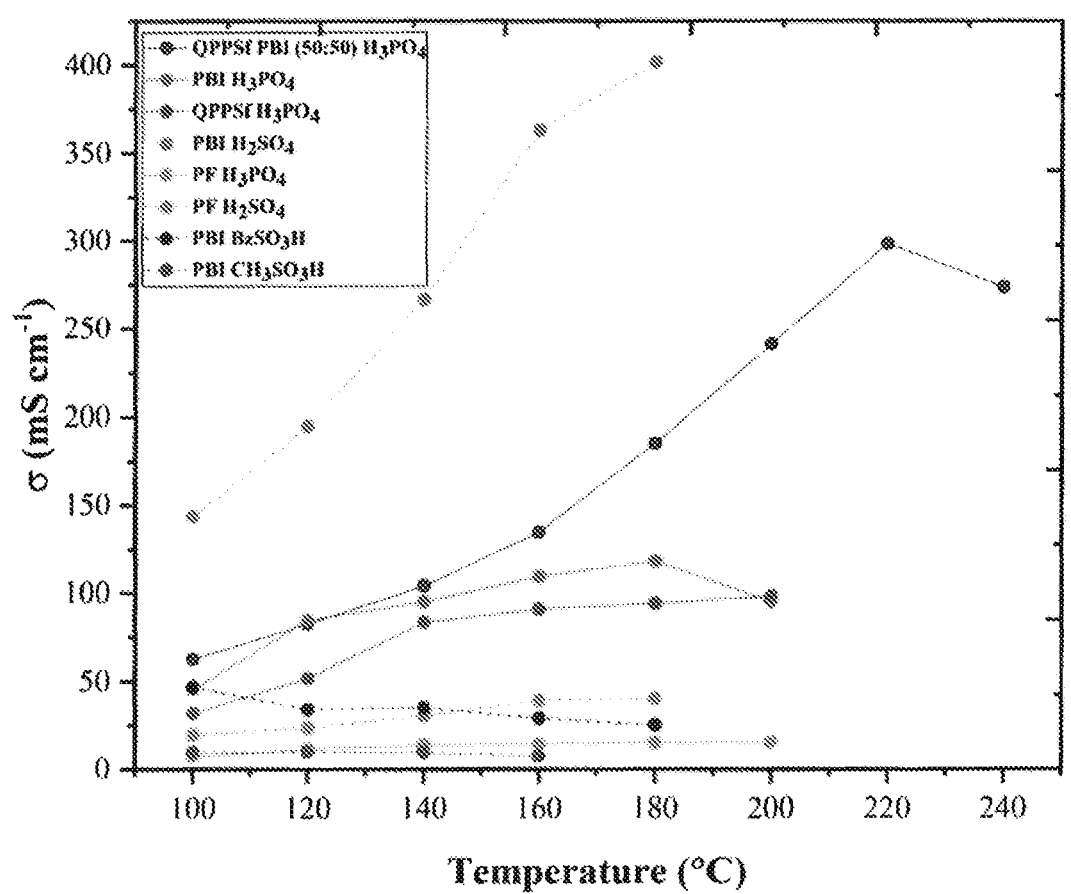
FIG. 10 presents proton conductivity of polycation-PBI blends, PBI, and other polycation chemistries with additional different acid chemistries.

FIGS. 9-10 show the proton conductivity of polycation-PBI blends, PBI, and other polycation chemistries with phosphoric acid (FIG. 9) different acid chemistries (FIG. 10; some of these acids are listed in FIG. 6). The polycation-PBI blend with $H_3PO_4$ displayed ionic conductivity up to 0.28 S cm$^{-1}$ 220° C. PBI doped sulfuric acid ($H_2SO_4$) displayed proton conductivity up over 0.40 S cm$^{-1}$. Thin film variants of polycation-PBI blend chemistry on interdigitated electrodes (IDEs) platforms displayed similar ionic conductivity values as the bulk membrane reported in FIG. 9. These IDE platforms demonstrate that these thin film ionomer, which represent their configuration as electrode binders in electrode layers, display similar ionic conductivity values as observed in bulk membranes.

Figure 13:
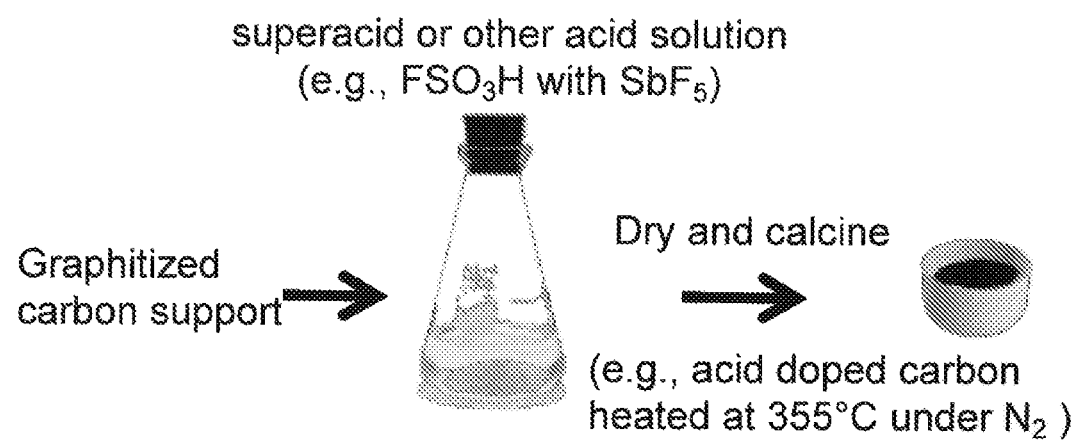
FIG. 13 presents an example to prepare an electrode support with an acid intercalated into porous carbon support. One method to do this is the incipient wetness impregnation.

FIG. 13 presents the preparation of superacid electrodes using a generalized incipient wetness impregnation technique. This is one method to access superacid electrodes for the anode. There are numerous methods to prepare solid-state superacid catalysts. FIG. 13 shows one incipient wetness impregnation method to intercalate $SbF_5$ into graphitized carbon.

For the ionomer binder in the electrodes (which applies to both reactor embodiments with a solid membrane electrolyte or a liquid electrolyte) and the reactor embodiment with a proton exchange membrane, acids of different strengths in polycation, PBI, or polycation-PBI blend polymer hosts govern ionic conduction, normalized to ionic loading, and chemical/thermal stability in the temperature ranges of 0 to 250° C. The ionomer binder plays a prominent role in the reactor for electrochemical upgrading of low molecular weight alkanes because the dissolved ionomer binder in the electrode layer assists in the activation of low molecular weight alkanes and it transfers protons produced from the electrochemical oxidation reaction to the liquid or membrane electrolyte—which in most cases is the same material as the dissolved ionomer in the electrode. The protons that migrate through the electrolyte separator are then recombined in the cathode to yield hydrogen (through the hydrogen evolution reaction). The cathode also features ionomer binders of the same type.

FIGS. 14-16 are linear sweep voltammogram of electrochemical oxidation of methane in different acid mixtures (e.g., fluorosulfonic acid ($HSO_3F$), $HSO_3F$ mixed with hydrofluoric acid (HF), and sulfuric acid ($H_2SO_4$)). The solid "methane (CH4) oxidation" curve shows an increase in current beginning near 0.6 V versus RHE and a shoulder near 0.9 V versus RHE. For comparison, a 'background scan' was recorded after bubbling Ar in the electrolyte for 30 minutes and also indicates oxidation current near 0.6 V albeit with a lower current density. This oxidation current is attributed to oxidation of the fluorosulfonic acid to peroxydisulfuric acid (or fluorinated equivalents). We ascribe the increased current associated with methane bubbling (~5-40% greater current relative to the scan with Ar) to methane oxidation. This setup was a single compartment electrochemical cell (FIG. 4). The cell featured a platinum wire working electrode, but could feature nanoscale platinum or platinum meshes or platinum gauze catalysts. The cell featured a platinum wire or graphite rod counter electrode. Other platinum group metals or platinum group metal oxides could be used as the catalyst for the anode (working electrode). Baseline data for the reactor free of methane is provided (argon gas bubbled through rather than methane). The batch reactor was operated at room temperature.

Likewise FIG. 15 shows voltammetry scans with Pt electrodes in $HSO_3F$-only electrolytes (no HF addition) indicating some methane oxidation relative to Ar; however, the $H_2SO_4$ electrolyte (FIG. 16) showed no additional current associated with methane bubbling independent of electrode material. Other experiments showed somewhat similar voltammetry behavior with iridium oxide electrodes; however, Au electrodes were etched in the highly acidic electrolytes.

Figure 17:
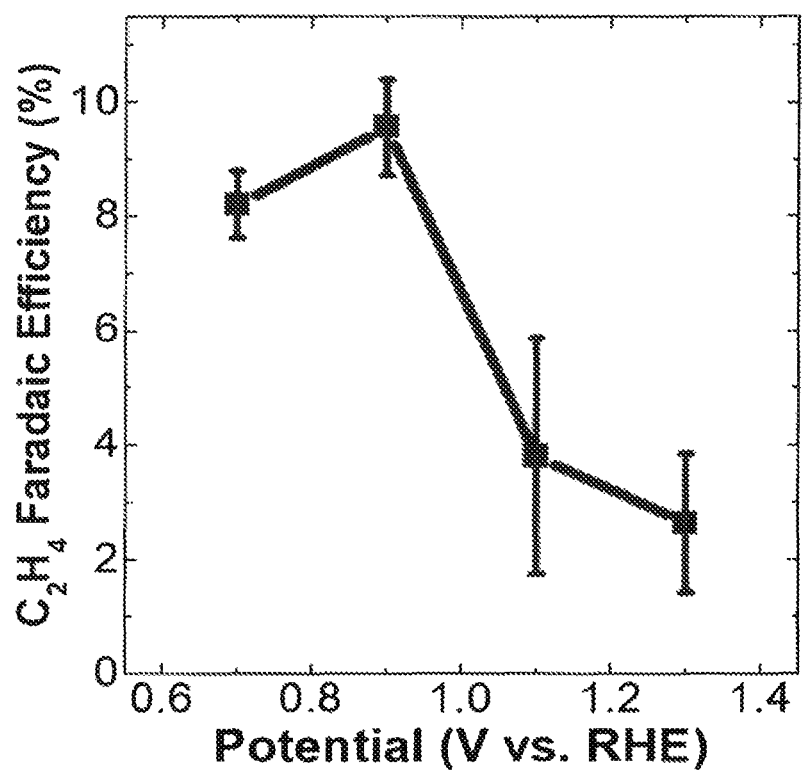
FIG. 17 reports the Faradaic efficiency of electrochemical oxidation of methane in fluorosulfonic acid and hydrofluoric acid mixtures.
Figure 18:
FIG. 18 presents dark liquid product collected after passing electric current through the cell and an acid neutralization and dichloromethane extraction process.

FIG. 17 reports the Faradaic efficiency of electrochemical oxidation of methane in fluorosulfonic acid and hydrofluoric acid mixtures. The cell setup for this experiment was FIG. 4. Faradaic efficiencies were calculated by measuring the amount of ethylene evolved from the reactor with gas chromatography (GC) instrument with a flame ionization detector (FID) or thermal conductivity detector. The Faradaic efficiency is the amount of ethylene evolved to the amount of electrical charge passed through the cell during a chronoamperometry experiment. A Faradaic efficiency of 2% to 10% was observed and was a function of the anode (working electrode) potential. The GC also detected ethane. As previously stated, the remainder of the current was attributed to electrochemical oxidation of the acid. When normalized to the background run (i.e., the difference in current observed with methane versus without a methane), then the Faradaic efficiency for ethylene was closer to 80 to 100% depending on the anode potential. After passing electrical current through the cell, a dark liquid product was collected through an acid neutralization and dichloromethane extraction process (FIG. 18). Liquid chromatography-mass spectrometry (LC-MS) sensed showed some $C_4$-$C_{12}$ hydrocarbons (see FIG. 19 for LC-MS spectrum of one of the $C_5$ olefin products). These products arise from further coupling of the $C_2$ products in the cell or further acidification, alkylation, and isomerization of the ethylene or ethane products.

Figure 19:
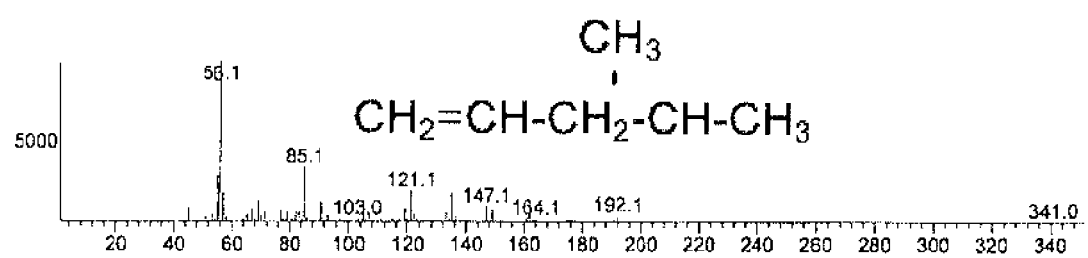
FIG. 19 presents liquid chromatography-mass spectrometry (LC-MS) following electrochemical oxidation of methane in fluorosulfonic acid and hydrofluoric acid mixtures.
Figure 20:
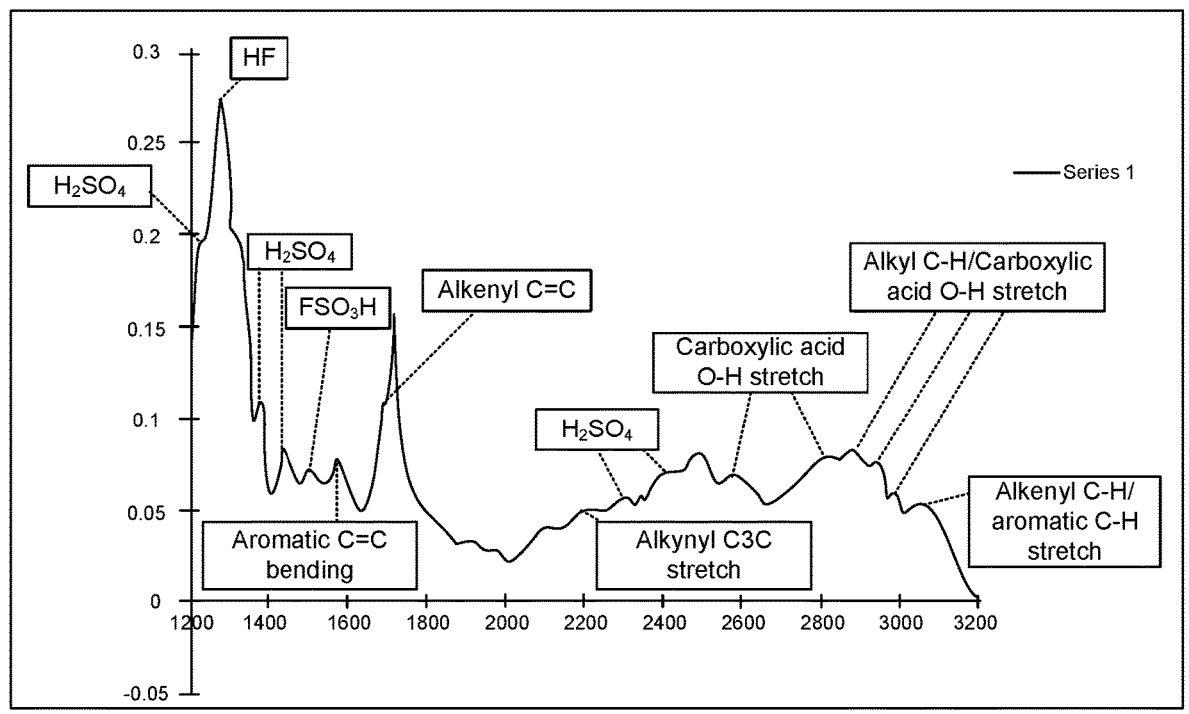
FIG. 20 is the FTIR spectra demonstrating detection of alkene moieties which derive from olefin products extracted the liquid cell experiments (FIGS. 4 and 16-18).

FIGS. 14-19 demonstrate upgrading of methane electrochemically to ethylene and other dark liquid like products. FIG. 14 shows anodic current by driving to large anode potentials in a fluorosulfonic acid and hydrofluoric acid with a platinum working electrode at room temperature. FIG. 17 reports the Faradaic efficiency with this demonstration (with FIG. 4 setup) at different anodic working potentials. FIG. 18 shows extracted liquid products from FIG. 4 cell and FIG. 19 is the LCMS of the liquid extracted product. FIG. 20 is a FTIR spectrum showing alkene peaks which is direct evidence of the formation of ethylene.

Figure 21:
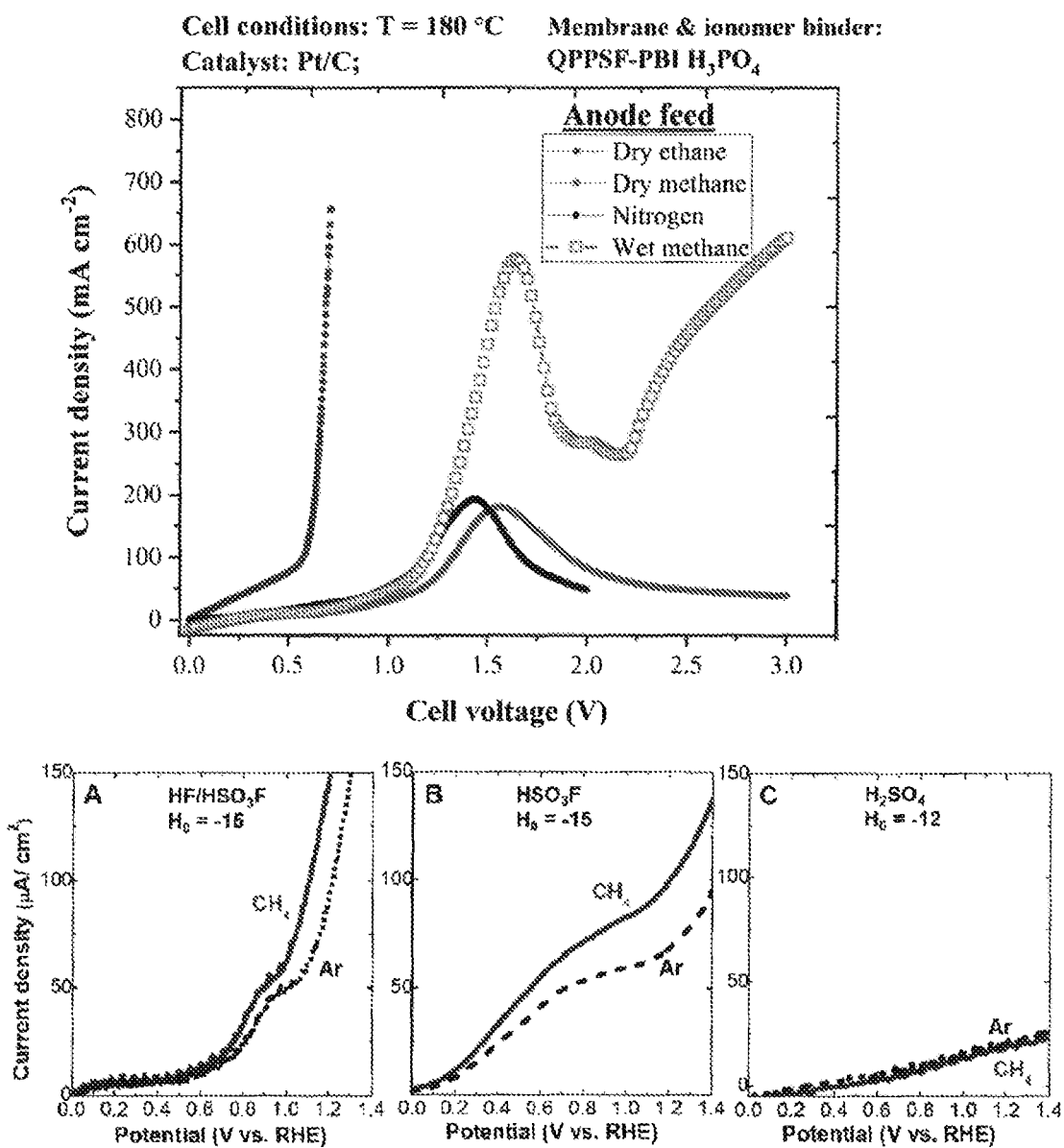
FIG. 21 is gas-phase electrolysis of methane and ethane (FIG. 1 configuration) at 180° C. with high temperature acid-doped ionomers (i.e., polymer hosts)—QPPSf-PBI $H_3PO_4$ membrane and ionomer binders (material shown in FIG. 8 and material properties of this material shown in FIGS. 9-12).

FIG. 21 presents test results of gas-phase electrolysis of pure methane and ethane feeds (separately) at 180° C. with the QPPSf-PBI $H_3PO_4$ membrane and ionomer binders. The cathode side featured dry nitrogen. Dry nitrogen was fed at the cathode without oxygen or halogens. The catalyst for the MEAs was platinum nanoparticles supported on high surface area carbon (Tanaka; 46 wt % Pt/C). The flow fields were custom made from titanium and featured a serpentine design. Linear sweep voltammetry was performed with the anode being the working electrode. Ethane experienced a rapid rise at about 550 mV indicating oxidation. LSV with methane or nitrogen fed into the anode showed a current peak in the range of 1.4 to 1.6 V. These peaks were attributed to the carbon oxidation in the electrodes.

Adding some water to the methane feed displayed current flow at 2.2 V in addition to the first current peak at 1.6 V. This current response above 2.2 V is mainly attributed to methane oxidation in the presence of water to carbon dioxide ($CO_2$) and carbon monoxide (CO) with evolution of hydrogen ($H_2$) at the cathode (similar to methane steam reforming). Thus, this gas-phase reactor variant is capable of performing steam reforming of methane and water vapor at relatively low temperatures (~200° C.) to produce CO, $CO_2$, and $H_2$ at temperatures well below commercial operations that operate between 800 to 1100° C.

We claim:

1. An apparatus for synthesizing higher order hydrocarbons from low molecular weight alkanes comprising:
   (a) an anode;
   (b) a cathode;
   (c) an acid electrolyte separator;
   (d) a catalyst;
   (e) electrode binders that feature one or more acids in the anode and cathode, wherein the one or more acids is trifluoromethanesulfonic acid ($CF_3SO_3H$), fluorosulfuric acid ($HSO_3F$), or an acid mixture, wherein the acid mixture is HF, $HSO_3F$, and $H_2SO_4$, or a mixture of sulfuric, chlorosulfonic, or perchloric acid;
(f) a low molecular weight hydrocarbon;
(g) wherein the catalysts are comprised of platinum group metals or platinum group metal oxides, or transition metal or transition metal oxides;
(h) wherein the anode and the cathode are in electronic communication to allow flow of electrons from the anode to the cathode;
(i) wherein the low molecular weight hydrocarbon is in contact with the anode; and,
wherein synthesis of a higher order hydrocarbon occurs at a temperature less than 400° C.

2. The apparatus of claim 1 wherein the low molecular weight hydrocarbon is methane and wherein the higher order hydrocarbon is an alkane, alkene, or aromatic product.

3. The apparatus of claim 1, wherein the one or more acids is trifluoromethanesulfonic acid ($CF_3SO_3H$) or fluorosulfuric acid ($HSO_3F$).

4. The apparatus of claim 3 wherein the anode and cathode further comprises an electrically conductive support material, catalyst, and an acid containing ionomer binder.

5. The apparatus of claim 4 wherein the synthesis reaction occurs at a temperature between 100° C. and 250° C.

6. The apparatus of claim 5 wherein the cathode and anode comprise a catalyst that is selected from a group consisting of ruthenium, rhodium, palladium, osmium, iridium, and platinum metal or the metal in its oxide form.

7. The apparatus of claim 6 wherein the acid containing ionomer binder comprises a polymer host, wherein the polymer host is selected from polybenzimidazole, polycations, or blends of polybenzimidazole-polycations.

8. The apparatus of claim 7 wherein the polymer host is the blend of the polybenzimidazole-polycation, wherein the cation group is selected from quaternary ammoniums, imidazoliums, phosphoniums, or ternary sulfoniums or sulfoxniums, or tethered metal cation centers.

9. The apparatus of claim 1, wherein the one or more acids is the acid mixture of HF, $HSO_3F$, and $H_2SO_4$.

10. An apparatus for synthesizing ethylene from methane:
(a) an anode;
(b) a cathode;
(c) an acid electrolyte separator;
(d) a catalyst;
(e) electrode binders that feature one or more acids in the anode and cathode, wherein the one or more acids is trifluoromethanesulfonic acid ($CF_3SO_3H$) or fluorosulfuric acid ($HSO_3F$);
(f) methane;
(g) wherein the catalysts are comprised of platinum group metals or platinum group metal oxides, or transition metal or transition metal oxides;
(h) wherein the anode and the cathode are in electronic communication to allow flow of electrons from the anode to the cathode;
(i) wherein the methane is in contact with the anode; and,
wherein synthesis of ethylene occurs at a temperature less than 400° C.

11. The apparatus of claim 10, wherein the anode and cathode further comprises an acid containing ionomer binder, wherein the acid containing ionomer binder comprises a polymer host, wherein the polymer host is selected from polybenzimidazole, polycations, or blends of polybenzimidazole-polycations.

12. The apparatus of claim 11, wherein the polycation material is selected from a group consisting of polyaromatic or perfluorinated backbones with tethered cation groups, wherein the tethered cation groups are selected from quaternary ammoniums, imidazoliums, phosphoniums, or ternary sulfoniums or sulfoxniums, or tethered metal cation centers.

13. A method for synthesizing higher order hydrocarbons from low molecular weight alkanes comprising:
a. providing an apparatus comprising:
i. an anode;
ii. a cathode;
iii. an acid electrolyte separator;
iv. a catalyst;
v. electrode binders that feature one or more acids in the anode and cathode;
vi. a low molecular weight hydrocarbon, wherein the low molecular weight alkane is methane and wherein the higher order hydrocarbon is an alkane, alkene, or aromatic product;
vii. wherein the catalysts are comprised of platinum group metals or platinum group metal oxides, or transition metal or transition metal oxides;
viii. wherein the anode and the cathode are in electronic communication to allow flow of electrons from the anode to the cathode;
ix. wherein the low molecular weight hydrocarbon is in contact with the anode; and,
wherein synthesis of a higher order hydrocarbon occurs at a temperature less than 400° C.;
b. feeding the low molecular weight hydrocarbon the apparatus;
c. applying an electrical current to the anode;
d. removing the higher order hydrocarbon synthesized in the apparatus;
e. removing hydrogen produced in the apparatus;
wherein the anode and cathode further comprises an electrically conductive support material, catalyst, and an acid containing ionomer binder, wherein the acid containing ionomer binder comprises a polymer host, wherein the polymer host is selected from polybenzimidazole, polycations, or blends of polybenzimidazole-polycations, wherein the polycation material is selected from a group consisting of polyaromatic or perfluorinated backbones with tethered cation groups, wherein the tethered cation groups are selected from quaternary ammoniums, imidazoliums, phosphoniums, or ternary sulfoniums or sulfoxniums, or tethered metal cation centers.

14. The method of claim 13 wherein the low molecular weight alkane is selected from a group consisting of methane, ethane, propane, butane and mixtures of these.

15. The method of claim 13 wherein the one or more acids is trifluoromethanesulfonic acid ($CF_3SO_3H$), fluorosulfuric acid ($HSO_3F$), or an acid mixture, wherein the acid mixture is HF, $HSO_3F$, and $H_2SO_4$, or a mixture of sulfuric, chlorosulfonic, or perchloric acid.

16. The method of claim 15 wherein the synthesis reaction occurs at a temperature between 100° C. and 250° C.

17. The method of claim 16 wherein the cathode and anode comprise a catalyst that is selected from a group consisting of ruthenium, rhodium, palladium, osmium, iridium, and platinum metal or the metal in its oxide form.

18. The method of claim 13 wherein the polymer host is the blend of polybenzimidazole-polycations.

19. The method of claim 18 wherein the polycation material is selected from quaternary ammoniums, imidazoliums, phosphoniums, or ternary sulfoniums or sulfoxniums, or tethered metal cation centers.

20. The method of claim 15, wherein the one or more acids is the acid mixture of HF, $HSO_3F$, and $H_2SO_4$.

* * * * *